Figure 1:
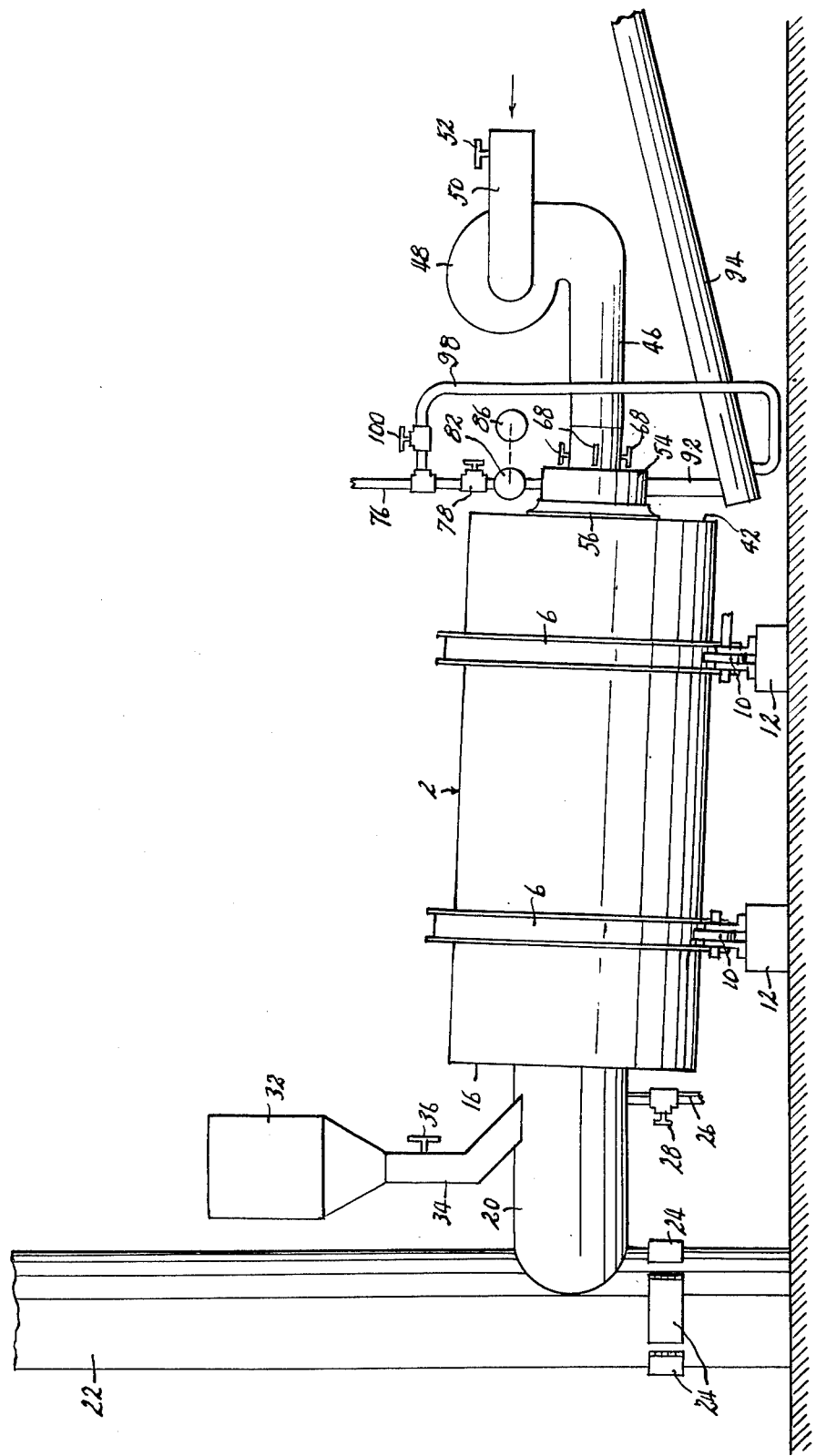

United States Patent [19]

Angelo, II

[11] 4,273,619
[45] Jun. 16, 1981

[54] APPARATUS FOR CONTINUOUSLY CARBONIZING AND ACTIVATING CARBONACEOUS MATERIALS

[76] Inventor: James F. Angelo, II, P.O. Box 212, Jonesboro, Ark. 72401

[21] Appl. No.: 95,366

[22] Filed: Nov. 19, 1979

[51] Int. Cl.³ .......................... C10B 1/10; C01B 31/08
[52] U.S. Cl. ........................................ 202/211; 201/38; 202/216; 252/421
[58] Field of Search ................ 252/421; 202/100, 131, 202/136, 216, 211, 218, 129, 134, 85; 201/28, 32, 34, 36, 38

[56] References Cited

U.S. PATENT DOCUMENTS

| | | | |
|---|---|---|---|
| 1,413,779 | 4/1922 | Randall | 202/100 |
| 2,648,637 | 8/1953 | Rodman, Jr. | 252/421 |
| 2,813,822 | 11/1957 | Collier | 202/100 X |
| 3,791,994 | 2/1974 | Wenzel et al. | 252/421 |
| 3,901,766 | 8/1975 | Smith | 202/131 X |
| 4,038,153 | 7/1977 | Deruelle et al. | 202/131 X |
| 4,122,036 | 10/1978 | Lewis | 252/421 |

FOREIGN PATENT DOCUMENTS 50-5676  3/1975  Japan ...................... 252/421
1001161  8/1965  United Kingdom ...................... 252/421

Primary Examiner—Frank W. Lutter
Assistant Examiner—Roger F. Phillips
Attorney, Agent, or Firm—John A. Hamilton

[57] ABSTRACT

An apparatus for carbonizing and then activating carbonaceous materials in a continuous process consisting of an elongated, slightly inclined rotary retort into the higher end of which the material is deposited and from the lower end of which the product is removed, the material moving therethrough in the form of a tumbling bed, a system for introducing air in independently regulatable amounts into each of a series of longitudinally spaces zones of the retort, except a final zone closest to its lower end, in such a manner that contact of the air with the material bed is delayed for a substantial time after the air enters the retort, and a system for introducing superheated steam into the final retort zone in such a manner as to immediately engage and thoroughly intermix with the material bed. Provision is also made for introducing air, rather than steam, into the final retort zone, in the event carbonization, but not activation, may be desired.

2 Claims, 7 Drawing Figures

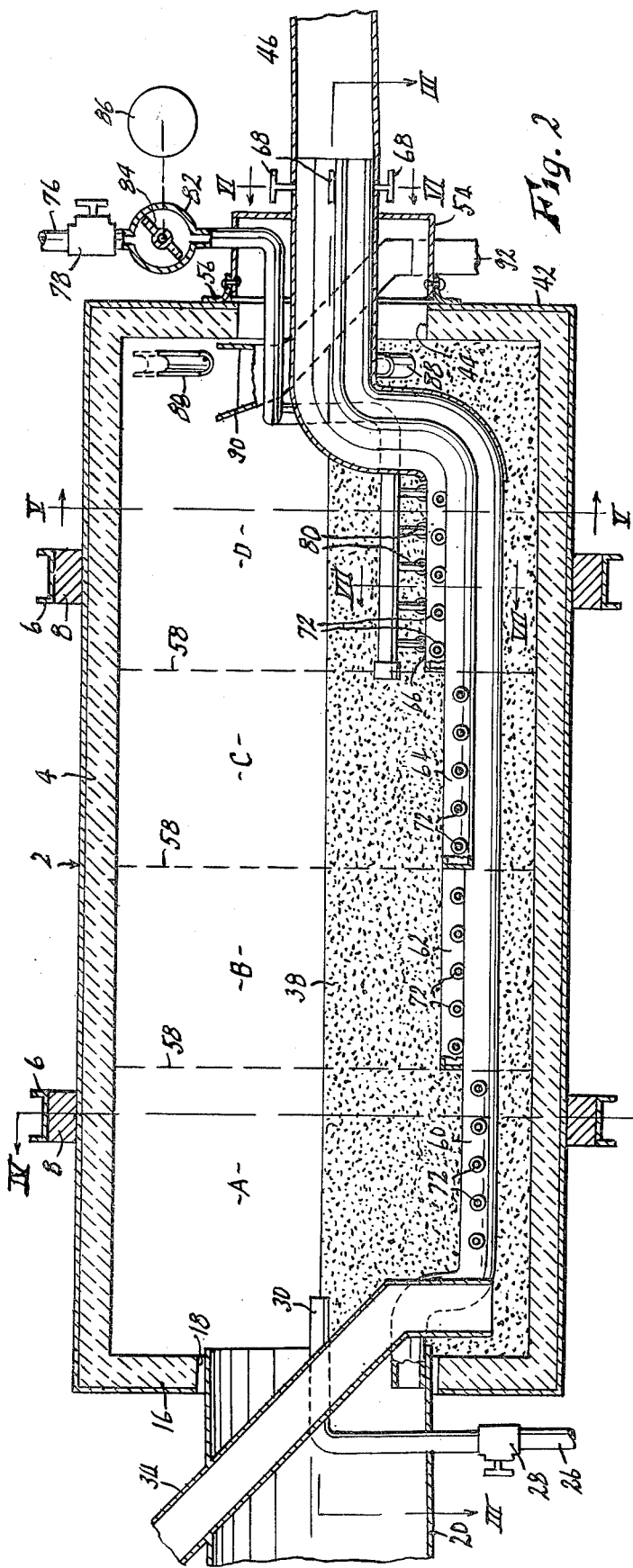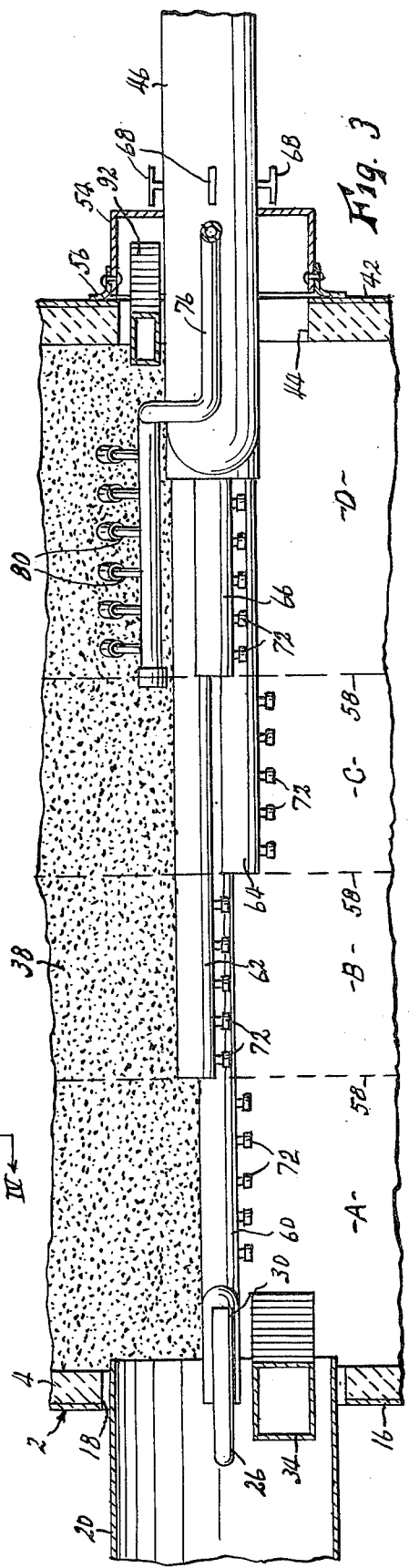

APPARATUS FOR CONTINUOUSLY CARBONIZING AND ACTIVATING CARBONACEOUS MATERIALS

This invention relates to new and useful improvements in apparatus for carbonizing such carbonaceous material as wood, coal, agricultural or industrial wastes, and in general any type of animal or vegetable material, to a charcoal form, and subsequently to activate the charcoal by further removal of the heavier volatile components thereof still retained therein. This increases the porosity and surface area of the carbon, and hence increases its adsorptive capacity in its use as activated carbon. The uses of activated carbon in purification operations are of course numerous. The provision of an apparatus capable of performing both the carbonization and the activation functions, in a continuous process in a single retort, is the overall object of the present invention. In certain respects, this application is a successor to application Ser. No. 894,406, filed Apr. 7, 1978 by the same applicant, and now abandoned.

In the present device, the carbonaceous material, in particulate form, is inserted into the upper end of a slightly inclined rotary retort, transported slowly through the length of the retort as a tumbling bed of material by rotating said retort, and the product removed from the lower end of the retort. At the entry end, the material is initially heated by an external fuel to dry it and elevate its temperature to a level at which carbonization commences. Once initiated, the carbonization reaction is self-sustaining and exothermic, giving off large quantities of heat and vaporizing much of the volatile components of the material, which are released as combustible hydrocarbon gases. The heat released is not in itself sufficient to dry freshly inserted material and bring it to carbonization temperature in a continuous process, so air is introduced into the retort in sufficient quantities to combine and burn with the hydrocarbon gases to produce the required heat. It has been found by long experience that closer control of the carbonization reaction can be maintained, and compensation made for variable factors such as the type of carbonaceous material being treated, and its moisture content and particle size, if the air is introduced in independently regulatable amounts into each of a series of longitudinally spaced zones of the retort. For example, particles which are large, or of high moisture content, or of a relatively dense, non-porous material require a higher temperature to dry and heat them sufficiently in a given time span. Successive retort zones closer to its lower end require progressively smaller amounts of air to burn lesser quantities of the gases to provide the heat necessary to insure carbonization of all of the material, and excessive air in these zones could result in excessive combustion and hence waste of the material. The provision of means operable to inject independently regulatable quantities of air into longitudinally successive zones of the retort is another object of the present invention.

Another object is the provision of means whereby the air is introduced into the retort along a path such that it intermixes with the hydrocarbon gases, and is burned therewith to consume its free oxygen, before it sweeps over the tumbling bed of material. Thus substantially only the hot, spent gaseous products of combustion engage the material. Contact of free oxygen therewith could cause combustion of objectionably large quantities thereof to ash.

When the self-sustaining carbonzation reaction is nearly completed, the temperature of the charcoal begins to drop, since so little combustible hydrocarbon gas is being emitted at that time that even if said gas is fully burned with air, it cannot supply enough heat to sustain the temperature the product has reached at that time. On the other hand, quantities of the heaviest fractions of the volatile materials of the raw material, hereinafter for convenience referred to as "tars", still remain in and tend to clog the pores of the charcoal which has been produced. This reduces the effective surface area of the carbon, reducing its adsorptive capacity, and is the principal reason ordinary charcoal is not considered to be "activated". Activation requires the removal and oxidation of as much as possible of these tars, and this in turn requires that the material be maintained at a high temperature, preferably at least as high as that it attained in the basic carbonization process, and in an oxidizing atmosphere, for a substantial time period after completion of the basic carbonization process.

Activation may be performed either exothermically or endothermically. In exothermic activation, air is passed over the charcoal to mix and burn with whatever combustible gas may still be being emitted, to supply whatever heat may be required to hold the product at a sufficiently high temperature for a sufficient time to effect activation. This is not considered to be a particularly effective method. Because of the small quantity of combustible gas being produced at that time, it is virtually impossible to prevent the introduced air from contacting the product, with the result that some of the carbon is burned to ash, which of course is a waste. Actually, some of the required heat is being produced by combustion of the carbon. To avoid excessive combustion of the carbon, the process must be carried on at a temperature lower than that conducive to effective activation, so that the quality of the activated carbon produced is reduced.

In endothermic activation, on the other hand, the charcoal, after basic carbonization, is passed through a zone of oxidizing but noncombustible gas, such as steam, carbon dioxide or the like, to further oxidize and activate it. The reaction, being endothermic, consumes large quantities of heat and will tend to cool the product rapidly to a temperature at which effective oxidation cannot occur, if some means is not provided to supply heat to maintain the desired temperature. Premature cooling would result in an incompletely or poorly activated product. However, there is no air in this zone to cause combustion of the char carbon, and the process can therefore be carried on at temperatures higher than before. A temperature at least as high as that at which the charcoal is produced is preferred, say 1200–1800 deg. F., and even higher temperatures can provide still higher rates of activation. The heat necessary to maintain these temperatures may be supplied by heating the oxidizing gas before it enters the activation zone. Superheated steam is perhaps the most practical oxidizing gas to employ. Accordingly, another object of the present invention is the provision of an apparatus of the character described having provisions whereby the basic initial carbonization may be caused to be substantially completed before the tumbling bed of material enters the final zone of the retort adjacent its lower end, and further means whereby superheated steam at any desired temperature, but not air, is introduced into said final retort zone.

Another object is the provision of means whereby the steam is injected directly into the tumbling bed of material in the form of pulsating jets. Since effectively no heat is being generated within the activation zone, it is important that the heat of the steam be conveyed to the bed as directly, efficiently and intimately as possible, and the penetration and agitation of the bed material by the pulsating jets provides an effective means for doing so.

Still another object is the provision of means whereby air, but not steam, may be supplied to the final retort zone when desired. This permits use of the entire length of the retort for the basic carbonization reaction, and hence permits a higher raw material feed rate and higher charcoal production capacity, whenever activation of the charcoal is not desired.

Figure 4:
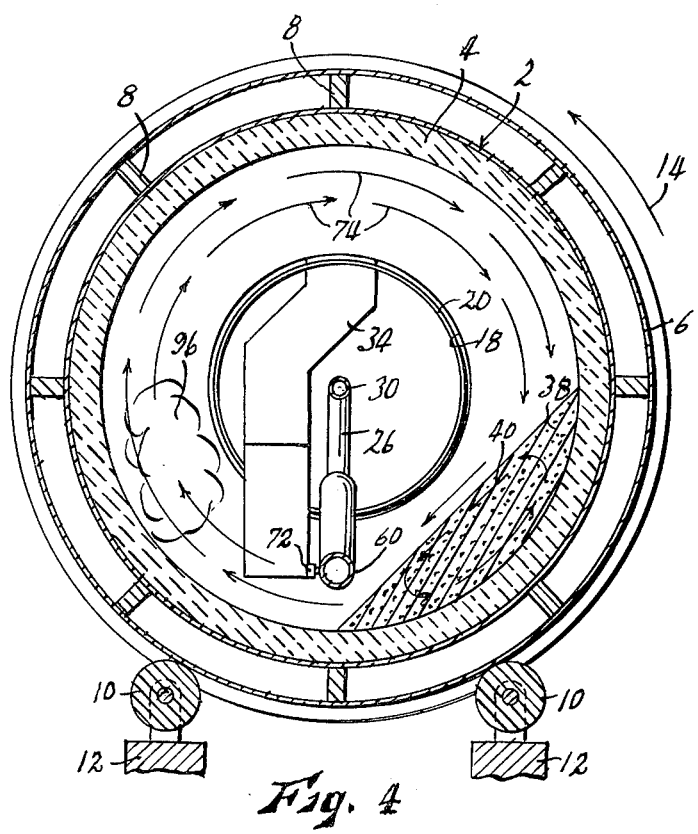
Figure 6:
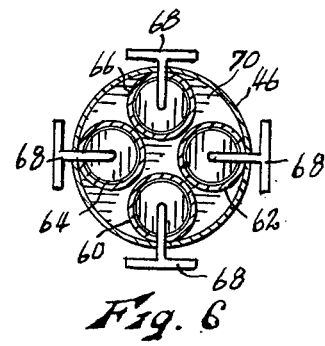
Figure 5:
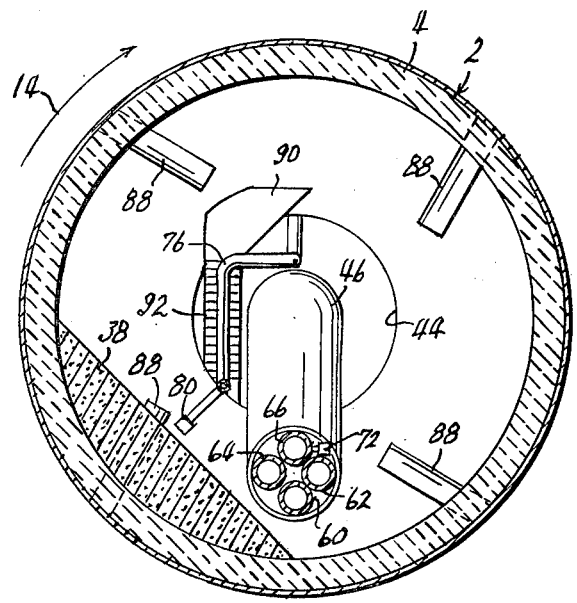
Figure 7:
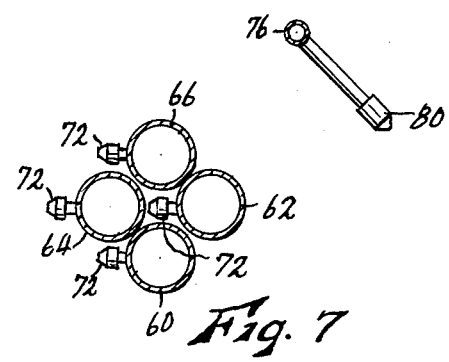

With these objects in view, as well other objects which will appear in the course of the specification, reference will be had to the accompanying drawing, wherein:

FIG. 1 is a partially schematic side elevational view, with parts broken away, of an apparatus embodying the present invention, FIG. 2 is an enlarged, longitudinal vertical sectional view of the retort and directly related elements of FIG. 1, with parts left in elevation, FIG. 3 is a fragmentary sectional view taken on line III—III of FIG. 2, with parts left in elevation, FIG. 4 is a fragmentary sectional view taken on line IV—IV of FIG. 2, FIG. 5 is a sectional view taken on line V—V of FIG. 2, FIG. 6 is an enlarged sectional view taken on line VI—VI of FIG. 2, and FIG. 7 is an enlarged sectional view taken on line VII—VII of FIG. 2.

Like reference numerals apply to similar parts throughout the several views, and the numeral 2 applies generally to a retort which constitutes a large cylindrical vessel having a lining 4 of refractory material. Its axis is inclined slightly from horizontal, and it has a pair of circular tracks 6 affixed concentrically thereabout respectively adjacent the ends thereof, as by spokes 8. Each track is supported by a pair of rollers 10 disposed respectively at opposite sides of the midline of the retort, each roller being carried rotatably by a ground-supported pillow block 12. At least one pair of said rollers are driven by any suitable power means, not shown, whereby the retort is turned slowly, about 2 or 3 r.p.m., in the direction of arrow 14 in FIGS. 4 and 5.

At the higher end of the retort, it is provided with an end wall 16 having a central aperture 18 into which extends one end of a flue pipe 20. Said flue pipe is rigidly supported by any suitable means, not shown, and extends horizontally from the retort, its opposite end being connected into a vertical stack 22, which may be of any desired or necessary height to create a required draft in the retort, and the stack is provided with air-admitting doors 24 beneath the level of the flue pipe, to provide air for the combustion of any combustible gases entering the stack, whereby the effluent of the stack may be as free of smoke and noxious fumes as possible. Extending into the flue pipe is a pipe 26 for conveying gas or other external fuel from any suitable source, under the control of valve 28, to a nozzle 30 directed into the mouth of the retort.

Particulate raw material of any desired type is carried in a hopper 32, and flows therefrom by gravity through a conduit 34, at a rate controlled by damper valve 36, said conduit being sealed in flue pipe 20, extending through the open end of said flue pipe into said retort, and angled downwardly to deposit said material in the lower portion of the retort at its higher end. When the retort is turning, the material tends to ride up the ascending side of the retort until it reaches its normal angle of repose, gathering in a bed 38, whereupon it begins to tumble as indicated by arrows 40 in FIG. 4. The bed advances slowly toward the lower end of the retort, due to the inclination of the retort. Preferably, the rate of addition of the raw material is so adjusted that bed 38 occupies approximately the lower quadrant of the retort at its ascending side, as shown.

At its lower end, retort 2 is provided with an end wall 42 having a central aperture 44 through which extends a large, generally horizontal, rigidly supported air pipe 46. Externally of the retort, said air pipe is connected to the output of a power driven blower 48, said blower having an air inlet pipe 50 regulated by a damper valve 52. Pipe 46 is of much smaller diameter than aperture 44, and a cylindrical housing 54 fixed to said pipe externally of the retort has a diameter corresponding to that of the aperture, with its open end disposed closely adjacent retort end wall 42. A flexible sealing flap 56 is secured to housing 54 around its open end, and has wiping contact with end wall 42, as the retort turns, to prevent the entry of air to the retort at this point. Air pipe 46 extends into the retort, and is offset downwardly just inside the retort to open into the retort in a direction parallel to its axis.

For purposes of discussion, the retort is divided transversely by dotted lines 58 in FIGS. 2 and 3 into a series of longitudinally successive zones A, B, C and D, although the number of said zones is optional. Enclosed in air pipe 46 are a plurality of smaller air pipes 60, 62, 64 and 66, corresponding in number to retort zones A, B, C and D. Externally of the retort, pipes 60, 62, 64 and 66 extend to a point in pipe 46 outside of housing 54, and each is equipped with an independently operable manual damper valve 68 for regulating the amount of air it receives from blower 48. As shown in FIG. 6, pipe 46 is provided with a filler wall 70 preventing the passage of air therethrough outside of pipes 60, 62, 64 and 66. Internally of the retort all of pipes 60, 62, 64 and 66 project from pipe 46 in a direction parallel to the retort axis. Pipe 60 extends the full length of the retort, its open opposite end being offset upwardly to rest in flue pipe 20 to serve as structural support for pipes 62, 64 and 66, which may be secured thereto be any suitable means, not shown. It is provided, only within the span of zone A, with lateral air jet nozzles 72, any excess air not passing through said nozzles being exhausted into the flue pipe to assist in creating the draft therein. Pipe 62 extends only through zone B, is closed at its inner end, and is provided with nozzles 72 only within the span of zone B. Pipe 64 extends only through zone C, is closed at its inner end, and is provided with nozzles 72 only within the span of zone C. Pipe 66 extends only through zone D, is closed at its inner end, and is provided with nozzles 72 only within the span of zone D. All of nozzles 72 are positioned to direct air into the retort substantially tangentially thereto, in an angular direction counter to the rotation of the retort itself, whereby to produce currents around the interior of the retort in the direction of arrows 74 in FIG. 4. A pipe 76, controlled by a manually operable valve 78, is operable to receive steam or any other suitable oxidizing gas from an external source, and extends in sealed relation through housing 54 and into the retort through aperture 44, its terminal portion extending longitudinally of retort zone D beside and above air pipes 60, 62, 64 and 66, at the ascending side of the retort. This terminal portion is provided with downwardly angled laterally extending nozzles 80 operable to direct forcible jets of the oxidizing gas directly into the mid-portion of bed 38, only within the span of retort zone D, as best shown in FIG. 5. As shown in FIGS. 1 and 2, a valve housing 82 is interposed in pipe 76 externally of the retort, and a butterfly valve 84 is rotated in said housing by any suitable means such as motor and gear reducer unit 86, whereby the gas jets delivered by nozzles 80 are intermittently pulsated.

The end product, whether it be activated carbon, or simply unactivated charcoal if desired, is removed from the lower end of the retort by a series of elongated, trough-shaped scoops 88 affixed to the retort wall in peripherally spaced relation adjacent its lower end, and projecting inwardly therefrom. Said scoops are positioned to open upwardly at the ascending side of the retort, whereby each receives a portion of the product as it passes through the tumbling bed 38 of said material, elevates it, and dumps it into a stationary hopper 90 disposed above large air pipe 46. Said hopper discharges into a conduit 92 which passes through aperture 44 of retort end wall 42, beside air pipe 46, into housing 54, then downwardly through said housing, in sealed relation thereto, being interconnected at its lower end into an inclined auger tube 94 or other suitable conveyor by which the product is conveyed to a storage container or the like. Said conveyor is sealed against the entry of air, and is of sufficient length, or is otherwise so cooled as by waterjacketing or the like, that the product is cooled below its ignition point before it is eventually again exposed to air.

In the operation of the device to produce activated carbon, the retort is set in rotation, particulate raw material is supplied thereto at a desired rate through conduit 34 from hopper 32, and blower 48 is actuated to supply air. Valve 68 of air pipe 66 is closed so that no air is delivered to retort zone D, and valve 78 is opened and butterfly valve 84 is actuated so that oxidizing gas is delivered in pulsating jets by nozzles 80. Fuel emerging from nozzle 30 is ignited, and the heat of this combustion initially thoroughly dries and heats the material to an elevated temperature at which the carbonization reaction can begin. This carbonization reaction amounts to a partial combustion of the raw material. It is exothermic in nature, releasing large quantities of heat as well as quantities of combustible hydrocarbon gas. It must be carried on in the substantial absence of air, in order to avoid excessive oxidation of the material to ash. Furthermore, the carbonization reaction is self-sustaining, so that once initiated, it continues without further heat supply until nearly all of the volatile constituents of the raw material are driven off, but the residual carbon is not itself oxidized so long as the material is shielded from direct contact with free oxygen.

However, additional heat is required, particularly in retort zone A, in the present continuous process, since the heat released by the exothermic carbonization reaction is not sufficient to dry and heat the continuously inserted fresh raw material to carbonization temperature. Depending on the specific raw material used, and on the particle size, moisture content, and relative porosity or density thereof, several times as much heat may be required for the drying and heating step as is released in the carbonization reaction. To supply this deficiency of heat, air is injected into the retort, particularly into zone A thereof, through nozzles 72 of air pipe 60. This induces a clockwise flow of gases in the retort, as indicated by arrows 74 in FIG. 4. Said gases flow over material bed 38, entraining therewith the combustible hydrocarbon gases being driven therefrom, then intermix with air emerging from pipe 60 and burn therewith, the principal combustion zone being in a "fireball" 96, also indicated in FIG. 4, which is spaced well apart from material bed 38. By the time the gases again circumnavigate the retort and again sweep over bed 38, all, or virtually all, of the free oxygen of the air will have been consumed, so that no, or virtually no, oxidation of the residual carbon in the material occurs. The material in the bed is heated and dried by the hot gases, by radiation from the fireball, and by its direct contact with the extremely hot lining 4 of the retort. Even distribution of heat through the total mass of the bed, from all of these sources, is assured by the tumbling motion of the material within the bed. Once the process is established, it is rendered self-sustaining by heat produced by the carbonization reaction and by partial combustion of the hydrocarbon gases, and fuel theretofore supplied to nozzle 30 may be shut off. The combustion of only a portion of the hydrocarbon gas is required to supply the necessary heat, and the air supply is limited accordingly.

The exothermic carbonization reaction, once initiated, continues spontaneously until nearly all of the volatile hydrocarbons have been driven from the raw material to reduce it to a char, at a rate which is generally directly proportionate to the temperature to which it is subjected, although as previously discussed some of the heavier fractions, or "tars" of the volatile material will still remain embedded in the pores of the carbon. Ideally, the present structure is so designed that drying and heating of the raw material occurs mainly in zone A and only to a lesser extent in zone B, while the basic carbonization reaction occurs principally in zone B and only to a lesser extent in zone C, being substantially completed by the time the material passes into zone D. Therefore, no air is injected into zone D, so far as the exothermic carbonization reaction is concerned, since very little or no hydrocarbon gases are produced in this zone to be combusted with said air, and the air might then contact the material and cause undesired further combustion of the residual carbon of the material.

The advantages of the independently controlled injection of air to the various retort zones, as compared to uniform distribution of the air throughout the length of the retort, are believed to be obvious. It permits the reduction of air supply to any relatively later zone, wherein the production of combustible hydrocarbon gas is smaller, to the point that the free oxygen of the air is consumed before it can engage the material to cause unwanted combustion thereof. It permits the burning of only enough of the gases in each zone to maintain the desired optimum reaction temperature in each zone. It provides that any unburned gases produced in each later zone will be moved by the retort draft to successively earlier zones, where the air supply is normally successively greater, to provide for combustion of more of the gas, and eventually to zone A, where both the air supply and the demand for heat is normally greatest, with any gases still unburned in zone A passing out of the retort for burning in stack 22, where the air supply is substantially unlimited. By this method and means, a great variety of raw materials, of different particle sizes and moisture contents, may be most efficiently and effectively reduced to a char, also of desired properties. By concentrating heat in zone A, the drying and heating step is accomplished more quickly and carbonization is commenced at an earlier point in the retort, and the maintenance of optimum reaction temperatures in all zones causes the reaction to proceed with maximum efficiency. Both of these factors combine to increase the production capacity of the device, and to improve the quality of the product.

Zone D, essentially, is reserved for a reaction wherein the char is activated. This activation consists essentially of further oxidizing of the char in a suitable atmosphere to vaporize and remove as much as possible of the tars embedded in its pores, and hence to increase its porosity and multiply its surface area per unit of volume. Under some circumstances it could be accomplished by injecting air into zone D. However, this activation is also exothermic, as was the carbonization reaction, and hence must be carried out at a temperature much lower than at which the char normally enters zone D, to avoid excessive combustion of the char carbon, and has been found generally to produce activated carbon of low quality. Generally, it is considered preferable to subject the hot char to an atmosphere of gas which is oxidizing, but non-combustible, such as steam or carbon dioxide, steam usually being preferred. In the present apparatus, therefore, steam is injected into zone D through nozzles 80 of pipe 76. The steam reacts principally with the tars to form $CO_2$ and CO, whereby to "activate" the carbon. The $CO_2$ produced is of course also an oxdizing gas, and further reacts with the tars to produce still more activation. The CO is combustible, but cannot burn, which burning could reduce some of the residual carbon to ash. Instead, it is drawn by the retort draft to the earlier zones of the retort where it is burned with the air present in those zones. This combustion produces additional heat, which must be allowed for in the air supply settings of said earlier zones.

This reaction can be carried out at the temperatures at which the char is normally supplied to zone D, say 1200–1800 deg. Farh. However, this activation reaction is endothermic, as compared to the exothermic carbonization reaction, and hence causes a rapid cooling of the product in zone D. If some source of additional heat is not provided, the product could cool below the required reaction temperature, resulting in only partial activation, or in the case of large particles, activation of only the surface layers, leaving "inert" or non-activated cores. In the present apparatus, this additional heat is furnished by superheating the steam to a temperature at least as high as that of the charcoal entering zone D. Even higher steam temperatures will produce a still more rapid and efficient activation. Superheated steam at 2000 deg. Fahr. of even hotter may be supplied economically, and it is of course fed to the retort in sufficient quantity to offset the quantity of heat consumed by the endothermic activation reaction, and hence to maintain the necessarily high reaction temperature. Since no heat is actually being generated in zone D, but is in fact being consumed by the activation reaction, it is important that the steam be delivered as directly as possible to the product, and mixed thoroughly and intimately therewith with as little free circulation of the steam in the retort as possible. Any such free circulation of the steam results in wasteful dissipation of its heat, and in the removal thereof from zone D by the retort draft before it can give up its heat to the product. It is for this reason that steam nozzles 80 are disposed quite close to bed 38, so that virtually all of the steam must enter the bed. The nozzles could in fact be penetrated into the bed. Also, the use of steam jets, and the pulsation thereof, coupled with the fact that the material in the bed is also tumbling as previously described, provides for deep penetration of the steam into the bed, and for thorough "stirring" and agitation of the particles therein, whereby to insure extremely thorough, rapid and effective access for the steam to the carbon particles, with very little wastage of the steam. It is also advantageous to inject steam into the lower or entry end of auger tube 94, by means of a pipe 98 branched from steam pipe 76 and controlled by valve 100, since the steam thus introduced will produce some further activation of the carbon.

If it is desired to produce only charcoal, rather than activated carbon, this may be done by closing valve 78 to shut off the supply of steam to zone D, and opening valve 68 of air pipe 66 to supply air to zone D. The carbonization reaction, as already described, may then occur throughout the length of the retort, when the air supplies to all of the zones are properly adjusted. Since no more carbonization time is required than before, this means that the supply rate of the raw material may be increased to move through the retort at a higher rate, thereby increasing the production rate of the charcoal.

While I have shown and described a specific embodiment of my apparatus, it will be readily apparent that many minor changes could be made without departing from the spirit of the invention.

What I claim as new and desire to protect by Letters Patent is:

1. An apparatus for carbonizing a carbonaceous raw material to reduce it to a char, and for activating said char to produce activated carbon, comprising:
   a. an elongated cylindrical retort having its axis inclined slightly from horizontal,
   b. means operable to rotate said retort slowly about its axis,
   c. means operable to introduce said raw material in particulate form into the higher end of said retort, whereby it is advanced through said retort in the form of a tumbling bed by the rotation of said retort,
   d. means operable to remove the material from the lower end of the retort,
   e. means operable to induce a continuous draft in said retort toward the higher end thereof,
   f. means operable to inject air into the higher end zone of said retort, and to so regulate the air so injected that the carbonization reaction is completed within said higher retort end zone, and
   g. means operable to inject an oxdizing but non-combustible gas, but not air, into the lower end zone of said retort, said oxidizing gas being preheated to a temperature at least as high as that at which the material of the tumbling bed enters said lower end zone of the retort, said oxidizing gas injection means including nozzles spaced from the interior cylindrical wall of said retort and disposed above and in close proximity to said tumbling bed of material and operable to deliver forcible jets of oxidizing gas downwardly and directly into said tumbling bed of material only within said lower retort end zone, whereby to stir and agitate said material to provide improved permeation thereof by said gas.

2. An apparatus as recited in claim 1 with the addition of means operable to pulsate said gas jets rythmically, whereby further to improve the stirring and agitation of the bed material thereby.

* * * * *